L. A. VALLILLEE.
INTERNAL COMBUSTION ENGINE.
APPLICATION FILED JUNE 6, 1910.

983,328.

Patented Feb. 7, 1911.

3 SHEETS—SHEET 1.

Witnesses
Harry Davis
P. Lhee

Inventor.
L. A. Vallillee
By
E. Fetherstonhaugh
Atty

L. A. VALLILLEE.
INTERNAL COMBUSTION ENGINE.
APPLICATION FILED JUNE 6, 1910.

983,328.

Patented Feb. 7, 1911.
3 SHEETS—SHEET 2.

Witnesses
Harry Davis
P. Shee

Inventor
L. A. Vallillee
By

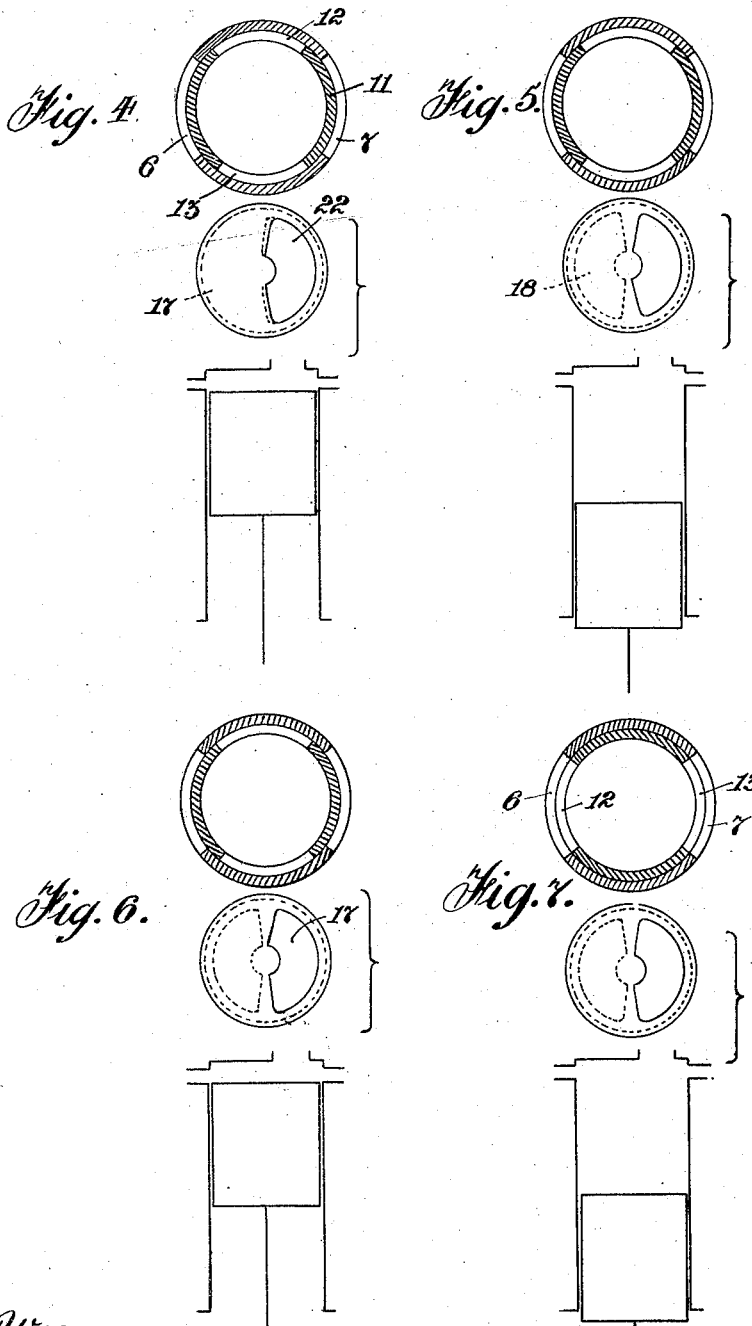

UNITED STATES PATENT OFFICE.

LEONARD ARCHIBALD VALLILLEE, OF BUCKINGHAM, QUEBEC, CANADA.

INTERNAL-COMBUSTION ENGINE.

983,328.

Specification of Letters Patent.

Patented Feb. 7, 1911.

Application filed June 6, 1910. Serial No. 565,279.

*To all whom it may concern:*

Be it known that I, LEONARD ARCHIBALD VALLILLEE, a subject of the King of Great Britain, and resident of the town of Buckingham, in the Province of Quebec, in the Dominion of Canada, have invented certain new and useful Improvements in Internal-Combustion Engines; and I do hereby declare that the following is a full, clear, and exact description of the same.

The invention relates to improvements in internal combustion engines, as described in the present specification and illustrated in the accompanying drawings that form part of the same.

The invention consists essentially in the novel construction and arrangement of parts whereby a large and free inlet opening is uncovered at regular intervals by a disk valve operating beneath the permanent head of the cylinder, and a sleeve exhaust valve is operated immediately under said disk valve.

The objects of the invention are to increase the efficiency of the internal combustion engine, to provide a simple and readily operated arrangement of valves, and generally to devise an engine of durable construction and comparatively cheap to manufacture.

Figure 1:
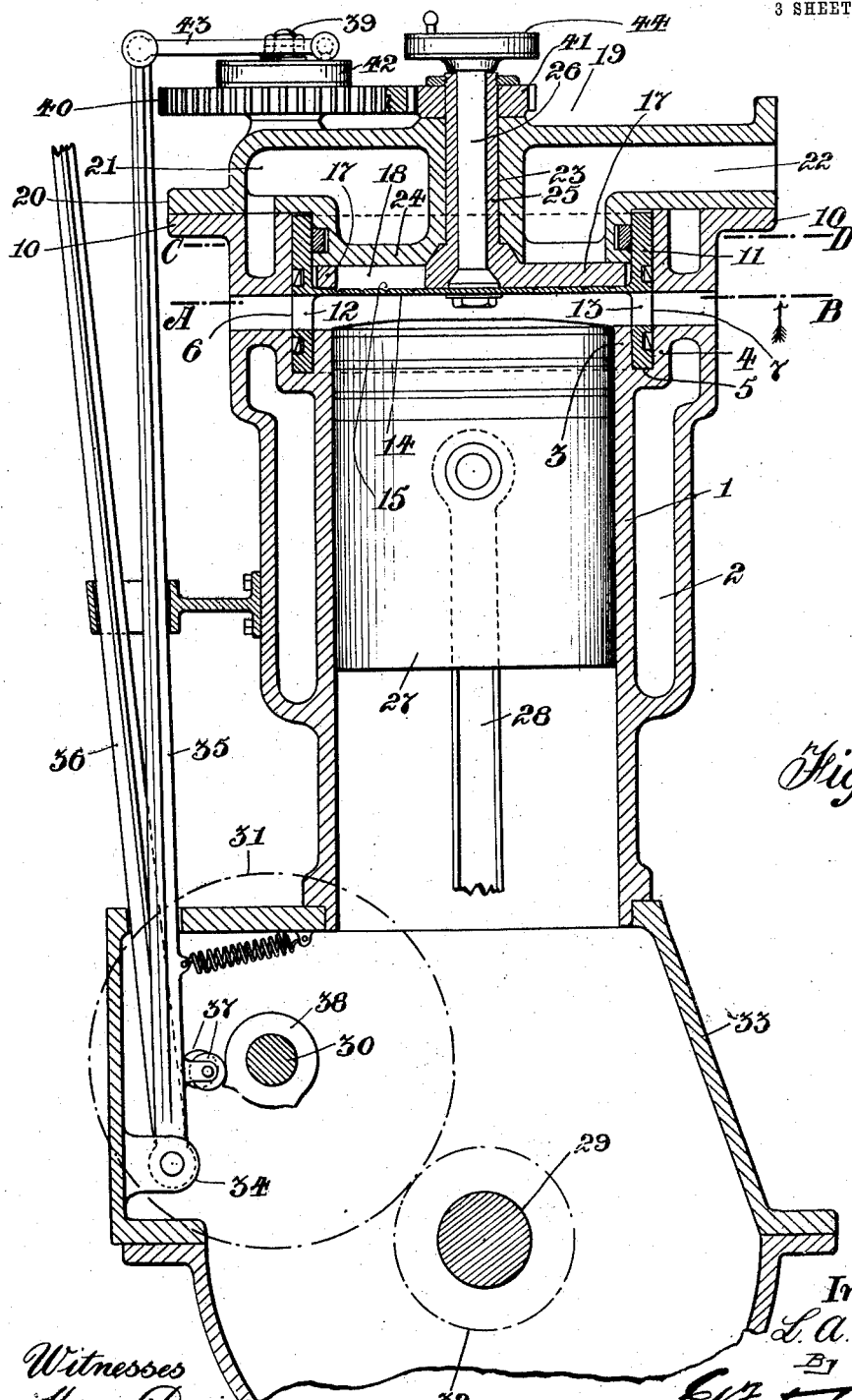
Figure 2:
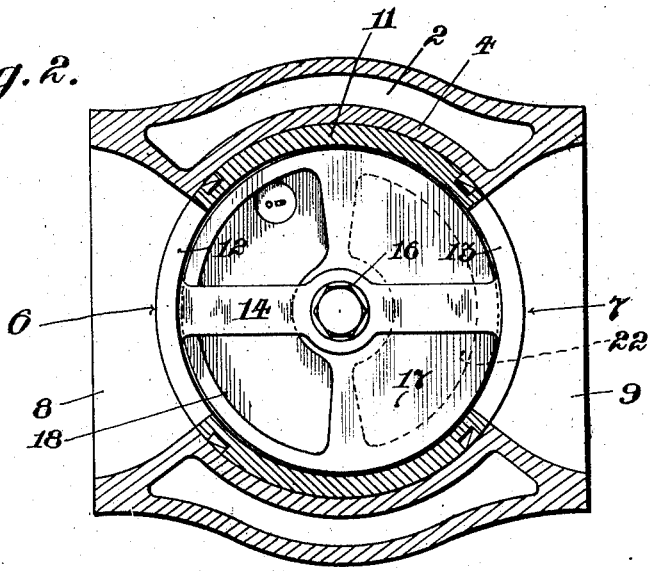
Figure 3:
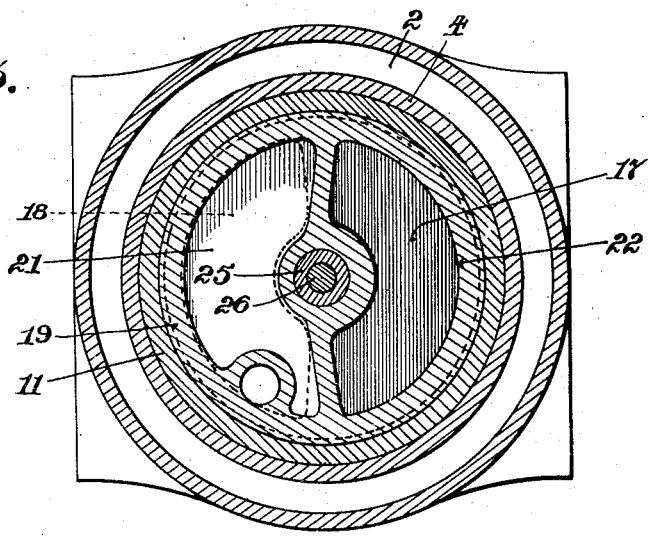

In the drawings, Figure 1 is a vertical sectional elevation of the engine. Fig. 2 is a cross section on the line A—B in Fig. 1. Fig. 3 is a cross section on the line C—D in Fig. 1. Fig. 4 is a diagrammatic view, showing the position of the valve at the beginning of the suction stroke. Fig. 5 is a diagrammatic view showing the position of the valves at the beginning of the compression stroke. Fig. 6 is a diagrammatic view showing the position at the beginning of the impulse stroke. Fig. 7 is a diagrammatic view showing the position of the valves at the beginning of the exhaust stroke.

Like numerals of reference indicate corresponding parts in each figure.

Referring to the drawings, 1 is the cylinder encircled by the water jacket 2 and open at the top and bottom and having the inner and outer walls 3 and 4 at the upper end forming the annular recess 5 and the circumferential exhaust ports 6 and 7 through said walls leading to the exhaust passages 8 and 9 through the water jacket, the outer casing of the water jacket having at the upper end thereof the outwardly extending flange 10.

11 is the exhaust valve of cylindrical form and having circumferential ports 12 and 13 adapted to register with the ports 6 and 7, the supporting cross bar 14 extending across from side to side just above said exhaust ports, said cross bar having the cross grooves 15 and the shaft orifice 16 in the center thereof. The valve 11 is introduced into the annular recess 5 and rotates therein.

17 is the inlet valve of disk form and turning within the sleeve exhaust valve 11 over the cross bar 14 and having the inlet port 18 therethrough occupying the greater part at one side of the center thereof, forming a large inlet opening almost one-half the size of the disk.

19 is the permanent head having the flange 20 secured to the flange 10 and the water jacket 21 and the inlet passage 22 through said water jacket and leading directly over one side of the inlet valve 17, said shaft also having the central shaft orifice 23 through said water jacket, the lower side 24 of said head extending downwardly to the inlet valve 17 within the sleeve exhaust valve 11, thus completely inclosing and holding said valves in place.

25 is a hollow shaft rigidly secured to the inlet valve 17 and journaled in the central orifice 23 and extending above said head.

26 is a shaft rigidly secured to the cross bar 14 and journaled in the hollow shaft 25 and extending thereabove.

27 is the piston operating in the cylinder 1.

28 is the piston rod.

29 is the crank shaft.

30 is the cam shaft operatively connected with the crank shaft 29 by the gears 31 and 32.

33 is the crank chamber casing.

34 is a lug extending inwardly from the crank chamber casing.

35 and 36 are rods forming part of the valve gear and supporting the rollers 37.

38 is a cam contacting with one of the rollers 37, another cam of similar form contacts with the other roller 37.

39 is a stub shaft extending upwardly from the head 19 at one side thereof.

40 is a gear journaled on the stub shaft 39 and coacting with the pinion 41 mounted on the hollow shaft 25.

42 is a ratchet arrangement operated from the rod 35 connected thereto by the link 43. This arrangement of ratchets is not described in detail as any form of friction clutch or ratchet clutch may be used, the ratchet 42 is secured to the gear 40 and the said gear is designed to rotate the pinion 41 and consequently the inlet valve 17 a half revolution, at each operation. The rod 36 is suitably connected to a ratchet arrangement 44 at the upper end of the shaft 26 for operating the exhaust valve 11.

In the operation of this engine at the beginning of the suction stroke, the inlet valve 17 is in position shown in the diagrammatic view in Fig. 4, consequently the explosive mixture will freely enter the cylinder through the inlet port 18 and on the completion of the suction stroke, the inlet valve will turn one half a revolution which completely closes the inlet port to the cylinder, then the compression stroke occurs followed by the impulse stroke. The ports 12 and 13 register with the ports 6 and 7 on the rotation of the exhaust valve, thereby permitting the exhaust of the exploded gases. The sleeve valve is turned direct by a ratchet connected to the valve gear and rotates at each operation one quarter of a revolution and always in the same direction. The cross grooves 15 in the cross bar of said sleeve valve relieve the upward pressure of the said cross bar on the disk valve caused by the explosive mixture in the explosion chamber. The disk or inlet valve is turned by the gear and ratchet arrangement always in one direction, consequently as both valves rotate intermittently in one direction only, the operation of the engine is comparatively smooth and noiseless.

The valve gear is not described in detail in this specification, as it forms subject matter in another application for a patent filed concurrently herewith.

What I claim as my invention is:

1. In an internal combustion engine, a cylinder having circumferential exhaust ports in the side walls thereof and an inlet port through the head, a piston operating in said cylinder, an exhaust valve of sleeve formation having circumferential ports adapted to register with the aforesaid exhaust ports, an inlet valve of disk formation arranged above said exhaust ports, and means for rotating said inlet and exhaust valves.

2. In an internal combustion engine, a cylinder having circumferential exhaust ports in the side walls thereof and an inlet port through the head, a piston operating in said cylinder, a sleeve suitably journaled at one end of said cylinder having circumferential exhaust ports therethrough and a cross bar connecting the inner walls above the ports, a disk inlet valve having an inlet port therethrough registering with the aforesaid inlet port and turning within said sleeve valve above said cross bar, a hollow shaft extending from said disk valve through said head, a solid shaft extending through said hollow shaft and terminating thereabove, and means for operating the said shafts.

3. In an internal combustion engine, a cylinder having circumferential exhaust ports in the side wall thereof, an inlet port through the head and an annular recess formed at the upper part of the wall thereof, a piston operating therein, a sleeve valve turning in said annular recess and having suitable exhaust ports and a cross bar joining the inner walls immediately above said ports, a shaft secured to said cross bar and extending upwardly through the head, a disk forming an inlet valve and turning in said sleeve valve above said cross bar and having a port therethrough registering with said inlet port and forming a segment of a circle at one side of said disk, a hollow shaft encircling the aforesaid shaft and extending through the head of the cylinder, a crank shaft, a cam shaft, and a valve gear connecting said cam shaft with said valve shafts.

4. In a device of the class described, in combination, a cylinder having exhaust ports in the side walls thereof and permanent head rigidly secured thereto, a water jacket in said head and an inlet passage through said water jacket and head at one side of the center thereof, said head having a central journal orifice therethrough, a piston operating in said cylinder, a sleeve valve suitably journaled at the upper end of said cylinder having circumferential ports registering with the aforesaid ports and a supporting cross bar joining the inner walls thereof immediately above said ports, said cross bar having cross grooves therein arranged, a shaft extending upwardly from said cross bar through said central orifice in the head, a disk forming an inlet valve and turning within the wall of said sleeve above said cross bar and having at one side of the center thereof and for the greater portion of that half of the disk, an inlet port forming substantially a segment of a circle, a hollow shaft rigid with said disk and encircling the aforesaid shaft and journaled in said central orifice and extending above the head, a crank shaft, a cam shaft and a valve gear operatively connected to said shafts.

5. In a device of the class described, in combination, a cylinder encircled by a water jacket and having at the upper end thereof a double wall forming an annular recess and exhaust ports through said water jacket and said double walls and a permanent head having the lower portion thereof extending downwardly into said cylinder and an inlet port therein arranged, a sleeve having ports through the wall thereof and forming an exhaust valve and turning in said annular recess and having a supporting bar thereacross immediately above the ports, a shaft rigidly secured to said supporting bar and extending through said head and thereabove, a disk forming an inlet valve having an inlet port therethrough at one side of the center of substantially equal area to the inlet in the head, a hollow shaft rigid with said disk and encircling said solid shaft and extending above said head, a piston operating in said cylinder, a crank shaft suitably connected to said piston, a cam shaft and valve gear operatively connecting said cam shaft and said valve shaft.

Signed at the city of Ottawa, Ontario, Canada this 1st day of June 1910.

LEONARD ARCHIBALD VALLILLEE.

Witnesses:
GENE A. LIGEON,
B. A. RUNSBACK.